United States Patent [19]
Parra

[11] Patent Number: 5,313,556
[45] Date of Patent: May 17, 1994

[54] ACOUSTIC METHOD AND APPARATUS FOR IDENTIFYING HUMAN SONIC SOURCES

[75] Inventor: Jorge M. Parra, New Port Richey, Fla.

[73] Assignee: Seaway Technologies, Inc., New Port Richey, Fla.

[21] Appl. No.: 24,930

[22] Filed: Feb. 26, 1993

Related U.S. Application Data

[63] Continuation of Ser. No. 688,395, Apr. 22, 1991, abandoned, which is a continuation-in-part of Ser. No. 658,642, Feb. 22, 1991, abandoned.

[51] Int. Cl.$^5$ .............................................. G10L 5/06
[52] U.S. Cl. .................................................. 395/2.55
[58] Field of Search .................. 395/2, 2.55; 381/41–43, 45, 48–50

[56] References Cited

U.S. PATENT DOCUMENTS

| | | | |
|---|---|---|---|
| 3,673,331 | 6/1972 | Hair et al. | 381/42 |
| 3,737,580 | 6/1973 | Poza | 381/42 |
| 3,896,266 | 7/1975 | Waterbury | 381/42 |
| 4,053,710 | 10/1977 | Advani et al. | 381/42 |
| 4,827,518 | 5/1989 | Feustel et al. | 381/42 |
| 4,833,713 | 5/1989 | Muroi et al. | 381/42 |
| 4,837,804 | 6/1989 | Akita | 381/42 |

*Primary Examiner*—David D. Knepper
*Attorney, Agent, or Firm*—Pettis & McDonald

[57] ABSTRACT

The identity of an individual (known or unknown) is determined by a sonic profile of sounds issued through his oral-nasal passages. The sounds are converted to digital electrical signals and produce a three domain format of frequency, amplitude and time samples to produce an array of peaks and valleys constituting the sonic profile of an individual. A source or library of a sonic profiles in the same format of a known individual have the interrelationship including relative positions of said peaks and valleys of said sonic profile of the known individual with that of said unknown individual compared and a utilization signal is provided upon a detecting or non-detecting a correlation between said sonic profiles.

12 Claims, 5 Drawing Sheets

ACOUSTIC METHOD AND APPARATUS FOR IDENTIFYING HUMAN SONIC SOURCES

REFERENCE TO RELATED APPLICATION

This is a continuation of application Ser. No. 07/688,395, filed Apr. 22, 1991, which was abandoned upon the filing hereof, which is a continuation-in-part of U.S. application Ser. No. 07/658,642, filed Feb. 22, 1991, now abandoned, entitled "ACOUSTIC METHOD AND APPARATUS FOR IDENTIFYING HUMAN SONIC SOURCES".

BACKGROUND AND BRIEF DESCRIPTION OF THE INVENTION

The present invention is directed to an improved method and apparatus for identifying human sonic sources.

There are many situations where it is desirable to make a substantially positive identification of sounds originating through the mouth (oral-nasal cavity) of a human. In banking and credit card situations, correlation of the identity of the person presenting the card and the owner of the card requires some form of corroborating identification. As a further example, in police work, threatening, harassing and obscene telephone calls require substantially positive identification of the caller in conjunction with other evidence, before making an arrest of a suspect. As a further example, in extending credit over the telephone, vendors, in addition to credit card number verification, sometimes require caller correlation of fact indicia by voice with stored fact indicia, particularly where there is a controversy over whether or not certain goods were ordered.

The present invention is distinguished from speech recognition systems where spoken words are attempted to be identified by machine to produce a machine translation or identification thereof. In fact, in practice of the present invention, recognizable vowels, consonants and syllables, etc. sounds, making-up recognizable speech (which may be disguised by the suspect) are discarded and only the non-audible (typically infrasonic or sub-aural) portions or orally emitted sound through a human mouth are utilized in making a substantially positive recognition or identification of a suspect. The invention is based on the fact that while the voice may be disguised, certain physical structures in the voice box of a suspect, are for all practical purposes, not controllable by humans and that an initial rush of air develops an inaudible sound usually in the infrasonic range and that such sounds, although inaudible (below the audible frequency range) are unique to each individual. Thus, while audible portions of the sound emission from the human mouth or oral cavity may be used for identification purposes, the present invention is concerned with the low energy level portion of sound emitted by the human in making speech or other sounds emitted through the oral cavity.

According to the invention, sound recordings are first digitized (e.g., sequential samples of an analog wave are converted to binary words which may then be manipulated to first delete (in this preferred embodiment) the audible portion of the sound recording. Then the remaining portion is analyzed time-wise, frequency-wise and amplitude-wise (three domains), and displayed both on an electronic display and, if desired, a printed display. The signals from which the display is prepared can be electronically compared to find points of correlation or visually compared to find points of correlation with a suspect recorded rendition of the same sound emissions.

Where telephone lines form a part of the path to the medium used to capture the voice sound pattern, because of the sharp spectral cut-off due to telephone bandwidth filtering, the voice sound wave to be recognized should be passed through essentially the same or similar paths before the comparison process of the present invention.

Mouth shapings, tongue, lip and other physical structures which affect the "sound" of speech can be used as by training various muscles and control to disguise a voice. However, those situations which are responsible for forming the inaudible sounds at the front or leading or trailing portion of an audible speech wave are generally not subject to such control and are involuntary, and essentially the same and unique for a given person. The frequency band under about 500 Hz is found throughout the speech spectrum and the infrasonic and sub or inaudible portions of the speech spectrum are particularly useful according to the present invention.

Typically, most tape recorders are relatively good at recording the inaudible sounds emitted orally through the mouth and not so good at the high frequency ranges. Thus, while high quality recording equipment can be used in the practice of this invention, one of the advantages and features of the invention is that inexpensive magnetic tape recorders (VARs), and low cost sound processing equipment can be used in practicing the invention. Moreover, for acoustic surveillance of business establishments which are subject to robberies (banks, convenience stores, gas stations, etc.), low cost voice activated recorders, which are on continuously during normal business hours with automatic reversing tape cassettes, endless loops, etc. or digital recorders wherein large scale FIFO memory arrays are used to capture the infrasonic sounds. It will be appreciated that, if desired, the recording can be timed and dated and stored in a permanent memory. It will also be appreciated that photographic evidence such as video cameras may be used to record the transaction and used in conjunction with the present invention to obtain a positive identification of a suspect.

The digitized portions of the card owner's name (for example) voice samples, prepared as described herein, are recorded on the magnetic strip of a credit bank, or charge card. At the point of use, the card holder is requested to speak his or her name which is transduced to electrical signals, digitized and compared against a stored digital rendition using the principles of this invention.

According to one aspect of the invention, sound or voice activated recorders are located at a bank teller's window, for example, to record the infrasonic acoustical emissions from a bank robber and the recording later used to assist in making a positive identification of the bank robber. Each teller is equipped with an inconspicuously located voice activated recorder (VAR) or microphone of a VAR. Each VAR records for ½ or 1 hour continuously recording over and over use an endless loop—15 minutes or automatic tape reversing machine. It could also be a digital recorder, or a solid-state memory which includes an analog-to-digital to FIFO memory. Then when there is a bank hold-up, the VAR is activated by the bank robber stating, for example, "This is a hold-up—put all of the money in the bag", "I have a bomb", etc. These short, commonly used vocalizations of the bank robber are recorded in the event of a robbery, and are saved and given to the police for analysis according to the invention, to identify possible suspects.

As a further use of the invention, prerecorded samples of the inaudible sounds produced by a bona fide telephone customer may be used to validate further telephone orders by that customer. The invention can also be used to identify persons at banks or for admittance to protected or restrictive areas.

The invention system involves first acquiring and storing a digitized voice sample. This is accomplished when a human subject speaks into a microphone connected to an analog-to-digital (AD) conversion circuit. Such AD circuit must be capable of sampling the analog input from the microphone at a rate of about 5,500 samples per second (or at least twice as high as the highest frequency needed) and must provide operator controls which permit precise selection of the sampling rate. The AD circuit is connected to the data bus of a computer which can retrieve the resulting stream of digital values for storage. The voice sample, thus converted, is stored on magnetic disk in which may be called a voice file.

The data in the voice file created by the above procedure is then imported by computer software capable of translating it into two types of on-screen graphic display. The first display type is a two-axis graph representing time (x) and amplitude (y). The software must permit selection ("marking") of a portion of the data thus visually represented using a pointing device such as a computer mouse. The software then translates that portion of the data represented by the selected ("marked") section of the visual display into a second type of on-screen display.

The second display type is a three-axis graph representing time (x), frequency (y) and amplitude (z). The selected portion of data is charted as multiple samples or "slices" of the original voice sample data. The number of slices charted is controlled by the software which selects the values of each nth sample from the selected portion of the voice file data to create a display group of the multiple slices separated by equal time intervals. By spacing each slice equidistant from the previous and the next slice, a cascade pattern is created in the display which, when complete, provides a three-dimensional visual array. For our purposes we term this display a "digital acoustic hologram" which becomes a digital hologram.

The juxtaposition of the lines and curves in any one slice to those of its neighbors, disclosed by the cascade pattern of the acoustic hologram, constitutes the fabric of the processed voice sample which is the basis for voice comparisons in the present invention. The contours and trends evident in the hologram are the "marks" by which a voice sample can be identified.

The voice identification system of this invention for police use is intended for comparison of a voice sample recorded on magnetic tape, obtained from a human subject either by telephone or microphone. A digitized sample is acquired and stored when the taped sample is replayed and the analog signal thus created is connected to an analog-to-digital (AD) conversion circuit. Such AD circuit must be capable of sampling the analog input acquired from the tape at a rate of at least 5,500 samples per second (or twice as high as the highest frequency needed) and must provide operator controls which permit precise selection of the sampling rate. The AD circuit is connected to the data bus of a computer which can retrieve the resulting stream of digital values for storage. The voice sample, thus converted, is stored on magnetic disk which may be called a voice file.

The data in the voice file created by the above procedure is then imported by computer software capable of translating it into an on-screen graphic display. The display generated by the computer software is a two-axis graph representing time (x) and amplitude (y).

The software also provides for the simultaneous display of a second two-axis graph beside the first graph. The second graph is generated by the software from a second voice file containing the digitized values from a voice sample of a person of known identity. The two voice samples thus displayed side-by-side can be compared visually by the operator who then forms a judgment as to whether the two voice samples are sufficiently similar tentatively to be considered a match.

In order to obtain two graphs with comparable data samples, the software must permit editing of each sample to delete from the displayed graph extraneous noises, excessively long spoken phrases and periods or gaps of silence. Through such editing, each sample can be reduced such that it represents only a sound known to have been produced by the subject's vocal cords, exclusive of any irrelevant sounds such as coughs, sneezes, breathing, etc., and reduced to approximately the same length of time as the other sample. Editing the samples can best be achieved through the use of a pointing device such as a computer mouse which can allow "marking" and subsequent deletion of a portion of the data. The software then retraces the display showing the remaining data.

It should be noted that the voice identification system of this invention is not intended to provide police agencies with a voice analysis for use as evidence in a criminal proceeding. While it may be possible that voice analyses could be accepted as evidence in the future, the purpose of the system as herein disclosed is to provide a tool for police use. It would be considered successful if, for example, it allowed officers to concentrate their efforts in an investigation on only a few suspects by eliminating dozens of others through the use of voice analysis.

It is to be clearly understood that, as discussed above, the invention does not require the use of the audible portion of recorded speech for identification purposes, but it may be used in conjunction with other speech recognition methods and apparatus.

The system described in U.S. Pat. No. 4,837,804 submits the analog voice signal as received by telephone to a process wherein numerical values are assigned to the differences between analog soundwave features. Although the language in the patent includes the term "digitize", it is referring to the arithmetic value assigned to the difference in waveform features, and not involve digitization of the voice sample itself.

This invention differs from the model in U.S. Pat. No. 4,837,804 in that the voice samples are digitized prior to comparison. This allows a more precise measurement of waveform features, storage of the digitized sample on magnetic media, and manipulation of the sample to optimize the comparison process. Also the system of U.S. Pat. No. 4,837,804 because it is intended to acquire a voice sample from telephone lines which clip frequencies below 500 hz, ignores the sub-aural portion of the frequency spectrum containing the waveforms most important in this comparison scheme.

The scheme disclosed in U.S. Pat. No. 4,827,518 includes digitization of voice samples and extraction of characteristic features from an articulated phrase. However, acknowledging that variations will occur from one voice sample to the next, it requires storage of a "plurality of cepstral coefficient sets" taken from multiple samples, apparently so as to match the one most similar to that from the test sample.

The present invention system differs form this scheme in that the patent method computes "closeness metrics" from multiple samples and bases its "decision" on those metrics. The system of this invention has no need to reference multiple samples because it analyzes only the sub-aural portion of the frequency spectrum, recognizing that activity in these lower frequencies does not change substantially from one voice sample to the next among samples taken from the same subject.

Although the system of U.S. Pat. No. 4,827,518, like the present system, provides digitization of its voice samples, it fails to acknowledge the limitations imposed by the Nyquist Effect which limits the highest frequencies of the digitized sample to a value that is one-half the sampling rate. By failing to specify that samples must be acquired at a sample rate sufficient to produce at least all frequencies within the aural range of the spectrum (which is purports to measure), and that each of two samples to be compared must be acquired with the same sample rate, the system reduces itself to a level of performance that can never be of practical benefit.

Another feature of the system of U.S. Pat. No. 4,827,518 is that voice features are stored on a card. However, the system of the present invention proposes storing the digitized data on a magnetic strip mounted on a card similar in size to a credit card, whereas the card of U.S. Pat. No. 4,827,518 would actually contain printed circuits which would interact with the user interface terminals.

The system of U.S. Pat. No. 4,833,713, like the U.S. Pat. No. 4,837,518 system, submits an analog voice signal for comparison. The device recognizes that the waveforms comprising a spoken word or phrase will not be precisely the same from one sample to the next. It purports to compensate for this, not by storing multiple samples, but by storing a consolidated voice pattern created from the superposition of "a plurality of voice patterns". The present invention does not denigrate or blur the stored voice sample by superimposition of multiple samples.

SUMMARY

The present invention differs from these schemes in that it digitizes the voice samples prior to comparison and is not constrained to match an articulated sample framed within a time window of specific duration as is required in the prior art. The present invention compares data contained in only a very thin slice of a sound sample, the duration of which can be as short as one one-hundredth of a second. Moreover, the system of this invention can achieve its comparisons matching any two vocalized samples. It is unnecessary for the samples being compared to be the same spoken word or phrase, or for that matter that they be a spoken word at all; any utterance involving use of the vocal cords is sufficient.

The single most significant difference between the system of this invention and the prior art schemes reviewed is the recognition implicit in this invention that regardless of changes from one voice sample to the next in the audible portion of the sound spectrum, the vibrations in the lower, sub-aural portion of the spectrum are substantially identical when compared from one voice sample to the next from the same person. Consequently it is not necessary to sample an entire spoken word or phrase; it is only necessary to sample a sound which includes vocal cord vibrations.

The above and other objects, advantages and features of the invention will become more apparent when considered in conjunction with the following specification and accompanying drawings wherein:

FIG. 1a is a block diagram of the process recording to the invention, FIG. 1b is a block diagram of a system incorporating the invention, FIG. 1c are pictorial representations of the system shown in FIG. 1a, FIG. 2a is representation of a voice print shown in the sampling of an inaudible portion for analysis, and FIG. 2b is a voice print generated from a digital voice sample by software, FIG. 3 is a three dimensional waveform showing time (y axis), frequency (x axis), and amplitude (z axis) and illustrating the valley/peak feature points used in the invention, FIG. 4 illustrates a credit card with a magnetic strip carrying a rendition of the acoustic print of the card owner, FIG. 5 is a block diagram of a verification system using the card of FIG. 4, FIG. 6 illustrates a teller window at banks which have been equipped with voice activated recorder, and FIG. 7 is a block diagram illustrating the conventional circuitry of a voice activated recorder and its adaptation to the purposes of the present invention.

DETAILED DESCRIPTION OF THE INVENTION

Figure 1A:
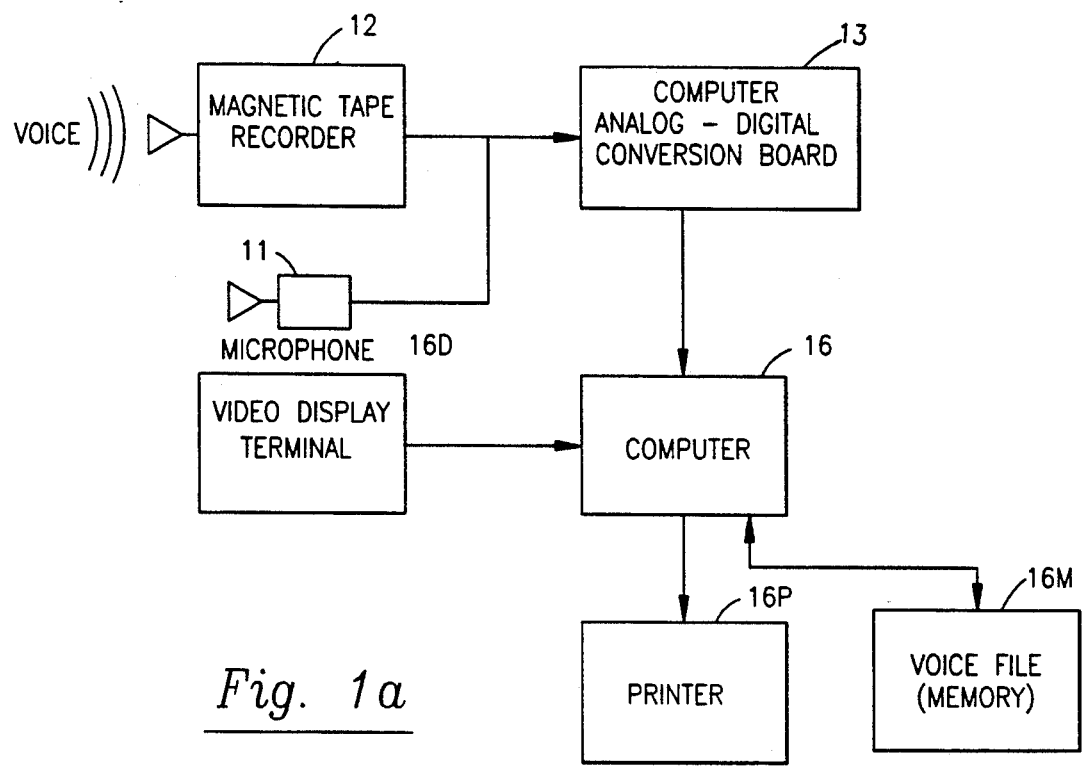
Figure 1B:
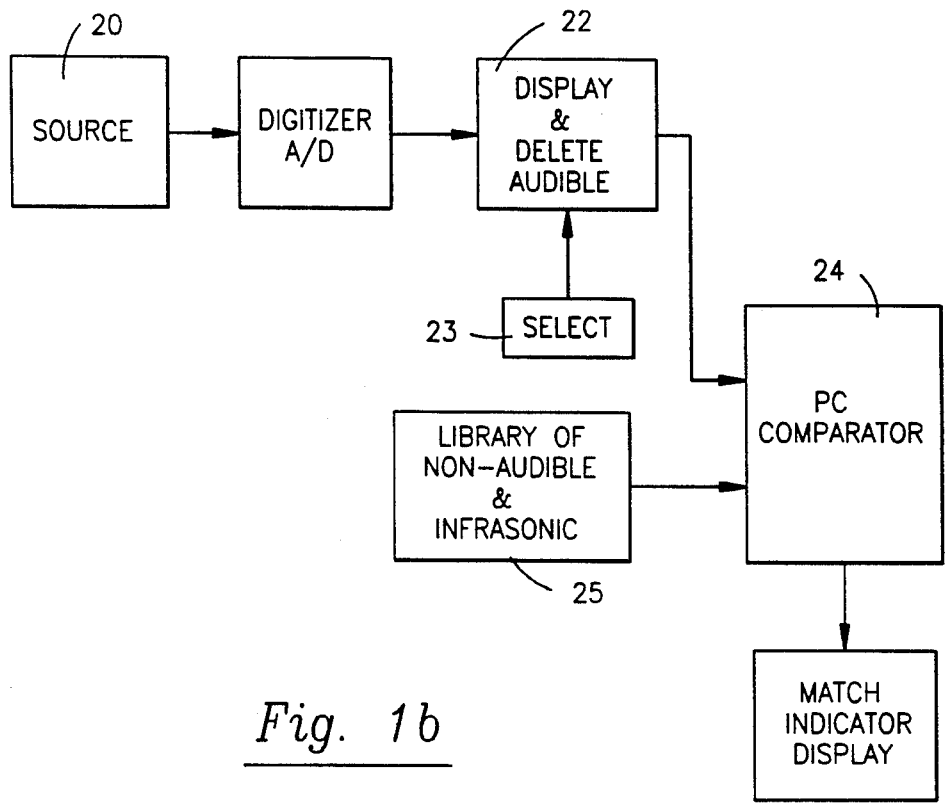
Figure 1C:
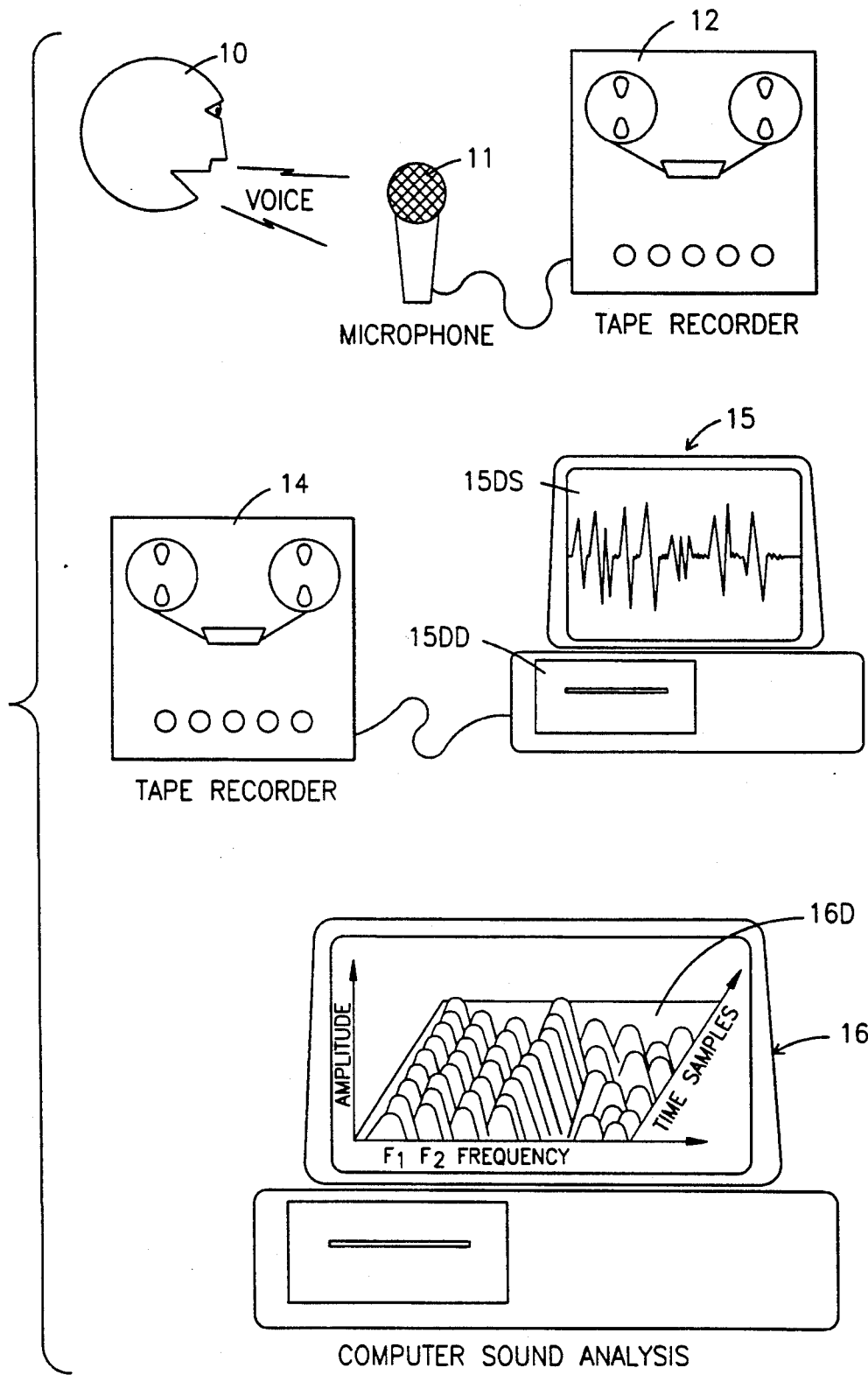

Referring to FIGS. 1a and 1c, a person 10 speaks into a microphone 11 on tape recorder 12 which transduces the pressure waves generated to digital signals. The tape recorder 12 and microphone 11 are shown separately to indicate that the tape recording may obviously be separate from the microphone and the tape played back through reproducing tape player 14 (FIG. 1c). These analog signals are supplied to an analog-to-digital conversion unit 13. (As noted earlier, where criminal activity is being pursued, it is desirable that essentially the same channel be used to prepare and present the analog signal to the computer analog-to-digital converter 13).

Figure 3:
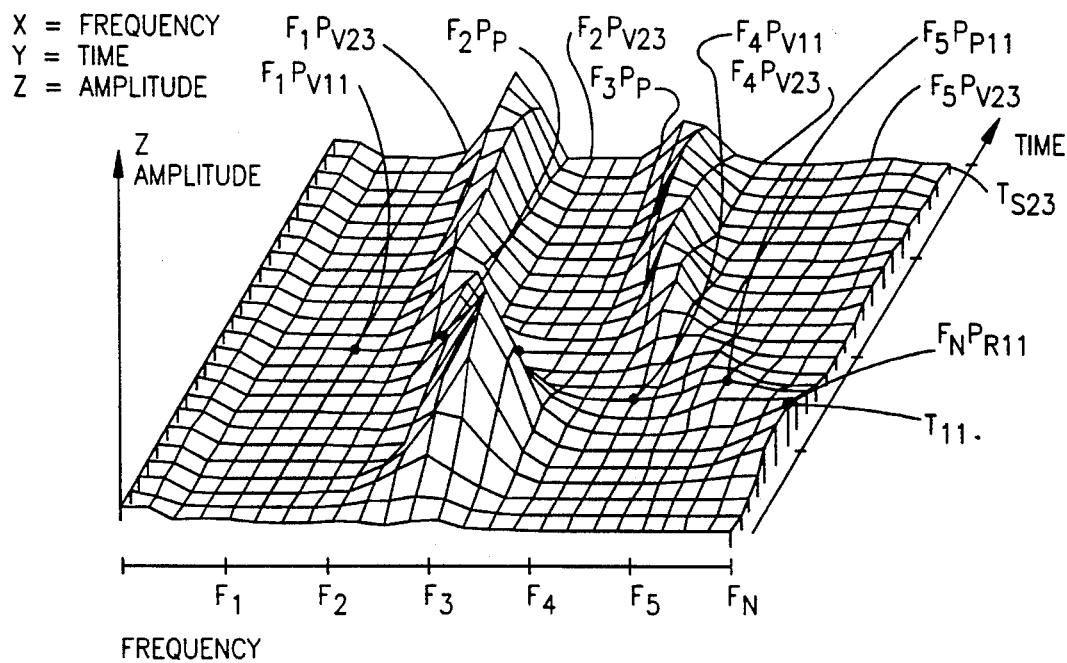
Figure 2A:
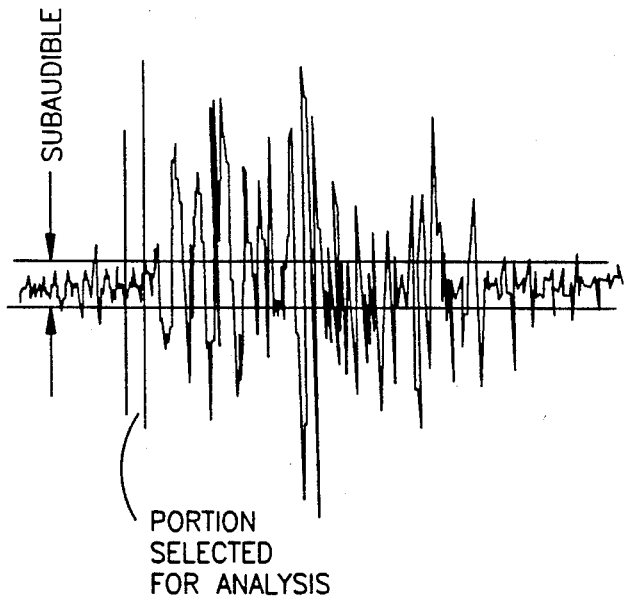
Figure 2B:
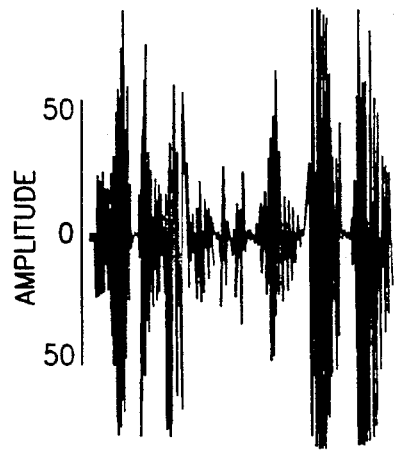

In FIG. 1c there is a pictorial representation of a conventional tape player 14 supplying the analog signal to a commercial PC computer 15 wherein the analog sample is converted to a digital sample by commercially available sound acquisition computer software by Tandy (Radio Shack). The digitized version (FIG. 2b) of an analog voice signal is presented on a display screen 15DS wherein the operator can select (by a mouse 15M, for example) a small sample or portion, preferably the sub-audible portion of the waveform for analysis. The selected digitized portion or sample is recorded on a magnetic disc and ejected from disc drive 15DD and inserted into the disc drive of a PC 16 having installed on its hard disc drive commercial computer sound analysis software (SAMPLEVISION ™ by GEM, for example). The computer sound analysis software processes the small portion of digital sound signal extracted by the operator and produces a three dimensional display 76P graph of FIG. 3 showing time (y axis) frequency (x axis), and amplitude (z axis). The time axes are slices or samples through each frequency. Voice profiles are stored in voice file memory 16M and can be printed on a printer 16P.

Referring now to FIG. 1b, a generalized block diagram incorporating the invention illustrates a sound source 20, has its analog output digitized by an analog-to-digital converter 21 and the output thereof supplied to a display unit 22 which can select portions for storage and more detailed analysis. Selector 23 may be a keyboard, mouse, etc., and the action corresponds to the selection process described in connection with FIG. 1c. A Three dimensional representation of the selected portion of the input soundwave is prepared in PC comparator 24.

A storage unit 25, which may be an optical CD, a magnetic memory, etc., stores a library of sonic profiles for individuals (bank customers, credit card users, and even known individuals) corresponding to the three dimensional display of FIG. 3 and supplies them to comparator 24 to compare against the sonic profiles or signatures from source 22.

FIG. 3 shows the inaudible (as used herein, sound whose frequency and/or energy level is below audible) has points of peaks $P_p$ and valleys $P_v$ which have distinctive patterns relative to each other, similar to the minutia (ridge endings, forks, etc.) of a fingerprint and are in a pattern unique to each individual, but unlike a fingerprint can be found throughout the speech pattern of the individual. That is to say, for each frequency, the energy peaks and valleys relative to adjacent frequency over a short time period have a relationship to the peaks and valleys of neighboring frequencies and constitute a code pattern unique to each individual. The identity code can be detected in a frequency—time-amplitude chart of as short a time period as 1/10 of a second or less. In FIG. 3, approximately 240 samples are shown where the sampling rate was 5,500 samples per second. Consider the time sample $T_{s11}$: where each frequency line $F_1, F_2, F_3 \ldots F_N$ intersects that time sample, the energy level may be between arbitrary but normalized levels of a peak or a valley. Since it is the ratio between peaks and valleys (or valleys and peaks) that is used, it is not amplitude dependent. For example, point $F_1 P_{v11}$ is a valley whereas $F_2 P_{p11}$ is a peak and $F_N P_{p11}$ is, relative to its surrounding points, a peak. The distribution of these features in a small fraction of a second of the sound wave constitutes a code unique to each individual and repeats throughout the speech of an individual. As noted above, a sampling rate of 5,500 samples per second may be used to provide sufficient data points within a small fraction of a second to make an identification.

Figure 4:
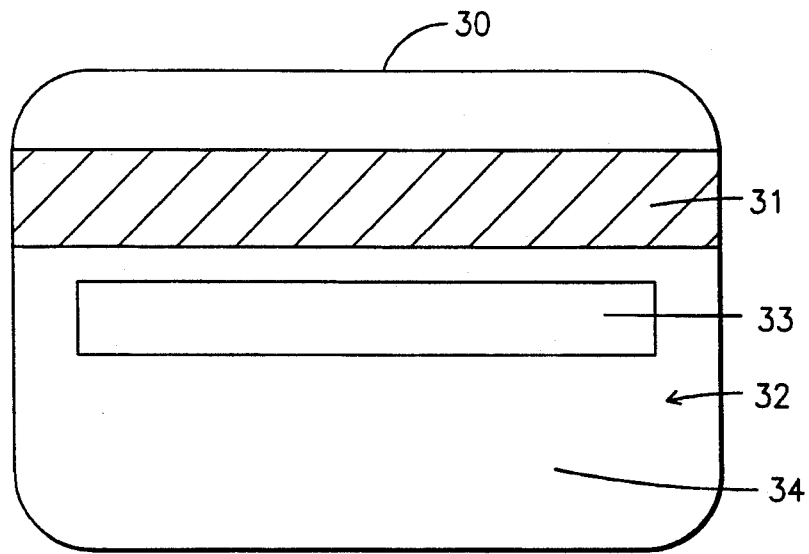
Figure 5:
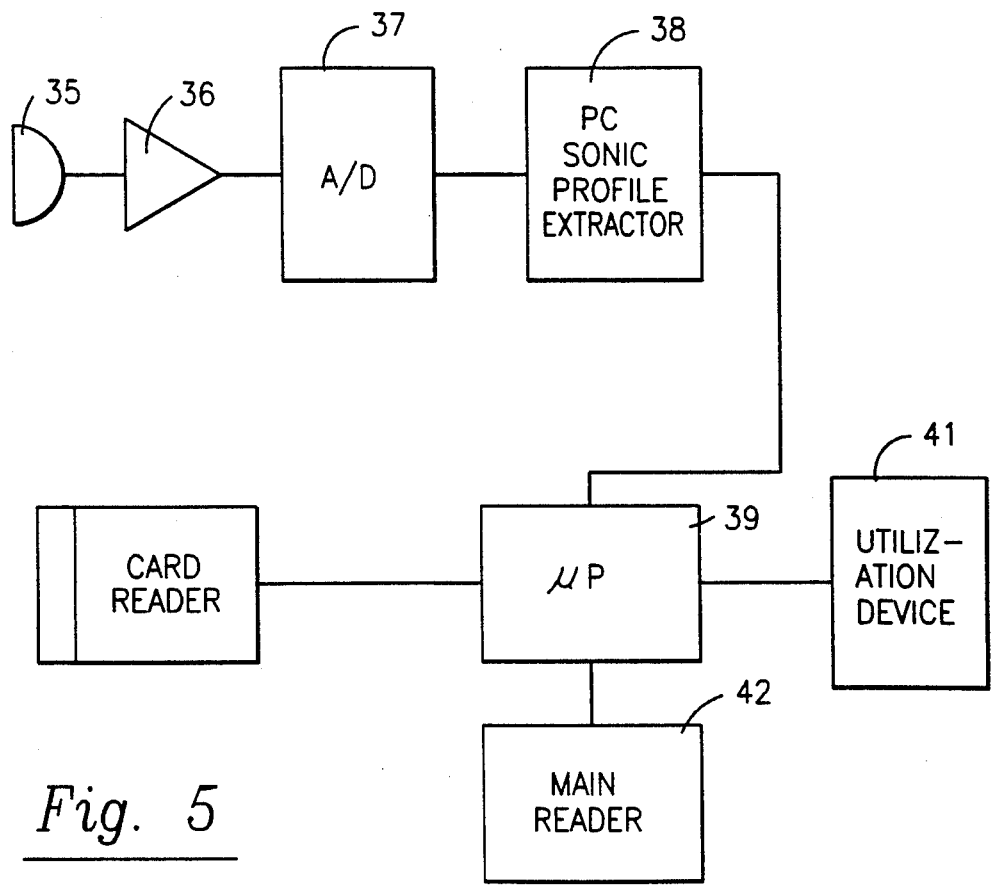

Referring to FIGS. 4 and 5, a card 30, typically made of plastic, has a magnetic strip 31 on one (the rear) surface 32 thereof, a signature block or field 33 and a section 34 for the embossment of the card number, card holder, expiration date, etc. According to this invention, a digital sonic profile produce as described above, corresponding to that of the card owner is recorded magnetic strip 30.

When the card is presented for a prescribed activity requiring that the card carrier also be the card owner, the carrier is requested to speak a few words into microphone 35, the electrical analog signal is amplified by amplifier 36 and converted to digital signals by analog-to-digital converter 37, and the digital signal is presented to sonic profile extractor 38 to produce a digital signal corresponding to the sonic profile illustrated in FIG. 3, which sonic profile is supplied to microprocessor 39. Card 30 is passed through slot 40S of card reader 40, which reads the digitally coded sonic profile off of the magnetic strip and supplies same to microprocessor 39 for comparison and, depending on the results of the comparison actuating a utilization device 41, which may be a signalling device to indicate a correlation or non-correlation and the identity which has been stored in the file voice file with the sonic profile.

Instead of a card 30, the library or voice file formed in 16M may be stored in a main memory 42 and accessed to verify the identity of the speaker.

Figure 6:
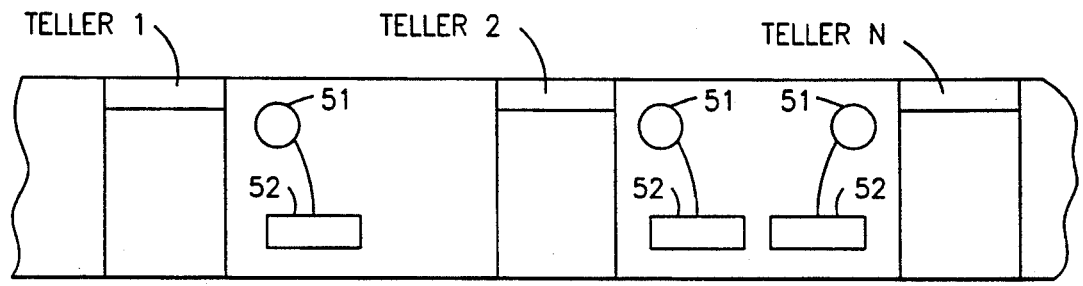
Figure 7:
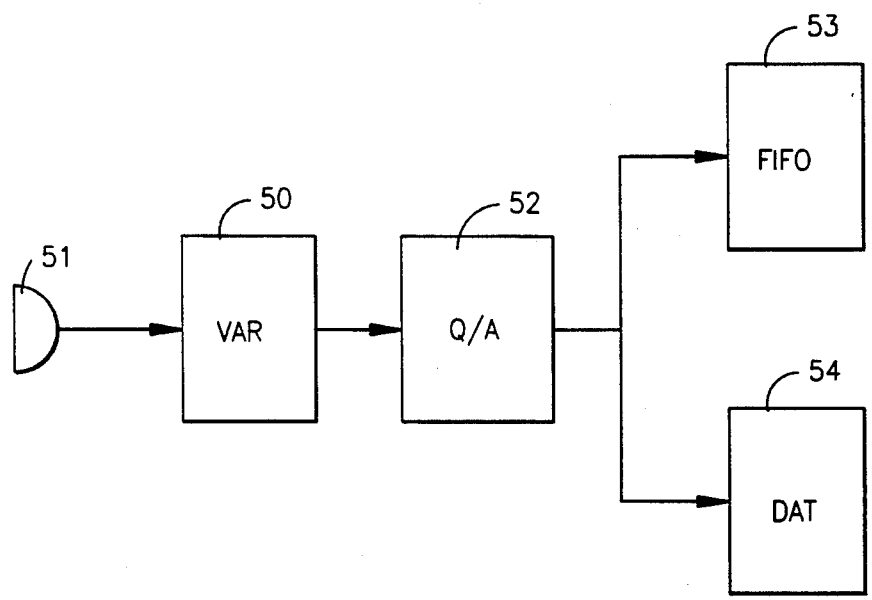

Referring now to FIGS. 6 and 7, a voice activated recorder (VAR) 50 has a microphone 51 located adjacent a teller's window in a bank, for example (it could be any site where similar financial transactions take place), and the voice of a robber, for example, is recorded on tape, or on a solid-state memory. In the event of a robbery or hold-up, the sounds emitted via the oral cavity (mouth-nasal passages) are recorded and analyzed as discussed earlier herein, to produce a sonic profile of the robber for later comparison and are in identification of the culprit. As shown in FIG. 7, the VAR 50 may include a digital-to-analog converter 52 supplying a solid-state memory 53 or an endless digital audio tape (DAT) 54 either of which may be used. A permanent record can also be made if desired.

While there has been shown and described preferred embodiments of the invention, it will be appreciated that various modifications and adaptations of the invention will become readily apparent to those skilled in the art and such modifications and adaptations are intended to be encompassed in the claims appended hereto.

What is claimed is:

1. A method of identifying an unknown individual comprising:
    transducing sounds produced by the oral-nasal cavity of a human to first digital electrical signals and deleting therefrom digital electrical signals corresponding to audible portions of said sounds to produce second digital electrical signal corresponding to inaudible portions of said sounds,
    converting said second digital electrical signals to a three domain format of frequency, amplitude and time samples to produce an array of peaks and valleys constituting a sonic profile of said unknown individual,
    providing a source of a sonic profile in the same format of a known individual, and
    comparing the interrelationship including relative positions of said peaks and valleys of said sonic profile of said known individual with the sonic profile of said unknown individual, and
    providing a utilization signal upon a detecting or non-detecting a correlation between said sonic profiles.

2. The method defined in claim 1 wherein only a fraction of a second of said second digital electrical signals of each sonic profile is required to form said comparing.

3. The invention defined in claim 1 wherein said time samples are less than an entire spoken word.

4. The invention defined in claim 3 wherein said time sample is as short as 1/100 of a second.

5. The invention defined in claim 1 wherein said sounds which are converted are in the sub-sonic range.

6. The invention defined in claim 1 wherein said sounds are in the infrasonic range.

7. Apparatus for identifying an unknown individual comprising:

means for transducing sounds produced by the oral-nasal cavity of a human to first digital electrical signals and detecting therefrom electrical signals corresponding to the audible portion of said sounds to produce second digital signals corresponding to the inaudible portions of said sounds, means for converting said second digital electrical signals to a three domain format of frequency, amplitude and time samples to produce an array of peaks and valleys constituting a sonic profile of said unknown individual, means for providing a source of a sonic profile in the same format of a known individual, an means for comparing the interrelationship including relative positions of said peaks and valleys of said sonic profile of said known individual with that of said sonic profile of said unknown individual, and providing a utilization signal upon a detecting or non-detecting a correlation between said sonic profiles.

8. The apparatus defined in claim 7 wherein only a fraction of a second of said second digital electrical signals of each sonic profile is required to form said comparing.

9. The invention defined in claim 7 wherein said time samples are less than an entire spoken word.

10. The invention defined in claim 7, wherein said time sample is as short as 1/100 of a second.

11. The invention defined in claim 7 wherein said sounds which are converted are in the sub-sonic range.

12. The invention defined in claim 7 wherein said sounds are in the infrasonic range.

* * * * *